United States Patent [19]

Honore et al.

[11] 3,878,476

[45] Apr. 15, 1975

[54] HETERODYNING CIRCUIT FOR CHANGING FREQUENCIES OF RECEIVED SIGNAL

[75] Inventors: Etienne Augustin Henri Honore, Chatenay Malabry, France; Emile Leon Gabriel Torcheux, deceased, late of Chatenay Malabry, France; Micheline Marie Torcheux, born Deloffre, Paris, France; Alain Torcheux, Paris, France; Adeline Garet, born Torcheaux, heirs, Paris, France

[73] Assignee: Societe d'Etude et d'Application des Techniques Nouvelles Neo–Tec

[22] Filed: June 29, 1973

[21] Appl. No.: 374,857

[30] Foreign Application Priority Data

July 27, 1972 France ............................. 72.27060

[52] U.S. Cl. .................... 331/38; 325/431; 331/39; 331/40

[51] Int. Cl. ........................................... H03b 21/02

[58] Field of Search ............................... 331/37–43, 331/30,31; 325/430–432, 434, 437

[56] References Cited

UNITED STATES PATENTS 2,892,944 6/1959 Wu ....................................... 331/37

3,320,547 5/1967 Standford et al. .................... 331/40

3,379,992 4/1968 Hoo ..................................... 331/41 X 3,409,836 11/1968 Wallett ............................. 331/22 X

*Primary Examiner*—Siegfried H. Grimm

*Attorney, Agent, or Firm*—Breitenfeld & Levine

[57] ABSTRACT

A heterodyning circuit for transforming frequencies lying in a predetermined high frequency range to a low frequency lying in a fixed passband comprises one or more frequency-changing stages each comprising a divider circuit to produce from a highstability source a heterodyne signal which is a multiple of a frequency *f* and which is selected in such a manner that the output of a mixer circuit to which the input signal and the heterodyne signal are applied has a frequency between *f*/2 and *f*, and further comprises a final frequency-changing stage comprising a mixer circuit receiving the signal from the previous stage through a bandpass filter and receiving a heterodyne signal of controllable frequency from a synthesiser-frequency divider circuit connected to the frequency source, and a low frequency filter of fixed passband at the output of the mixer circuit.

15 Claims, 9 Drawing Figures

HETERODYNING CIRCUIT FOR CHANGING FREQUENCIES OF RECEIVED SIGNAL

Figure 1:
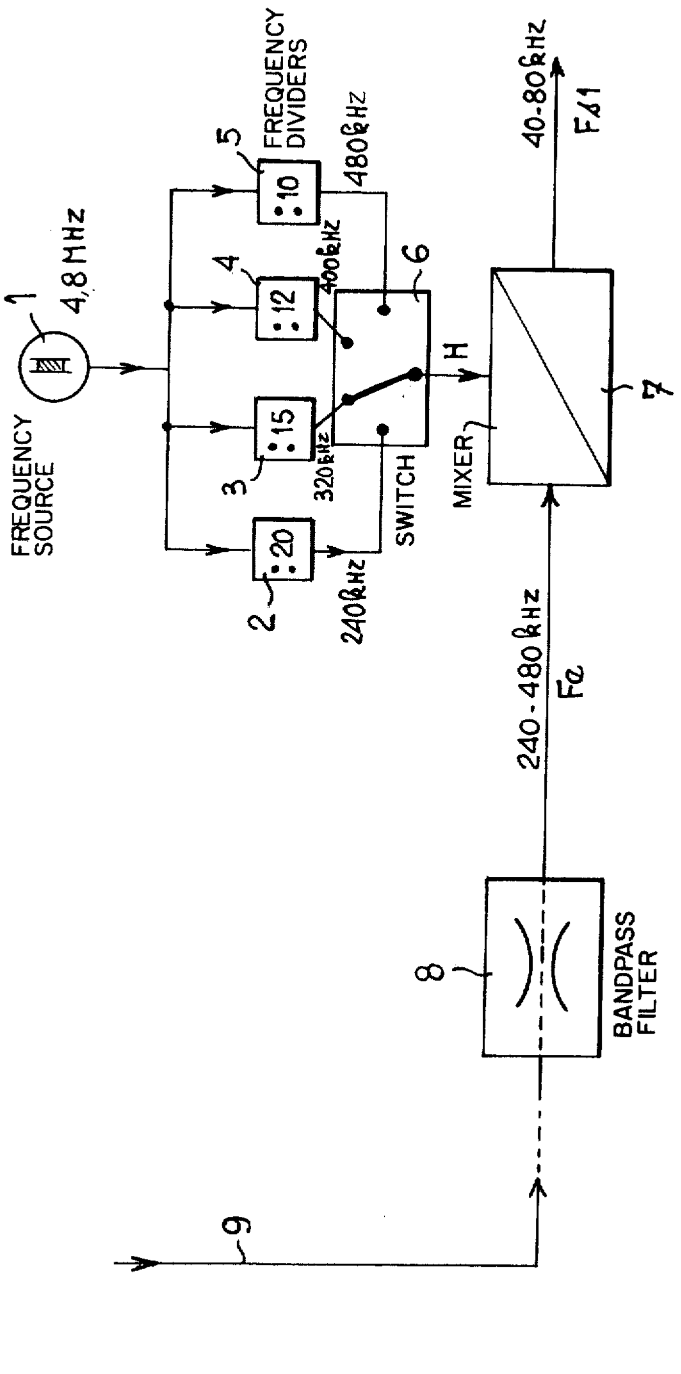

The present invention relates to frequency changing. The object of the invention is not to provide novel means for effecting frequency changing in general, but to provide frequency changing arrangements intended for a particular application.

In the first place, it is known that in order to effect a change of frequency it is necessary to have a circuit which supplies heterodyne frequency, a mixer circuit, and generally means for filtering in terms of frequency. An input signal is combined with the heterodyne signal in the mixer circuit so as to obtain an output signal which is as full of information as the input signal but is of lower frequency. The filtering means employed have a double function; on the one hand they serve to eliminate, if necessary, input signals known as image or phantom signals, that is to say signals capable of furnishing the same output signal frequency as that which corresponds to the useful input signals, and on the other hand they serve to prevent the transmission onward of the input signal and the heterodyne signal. In most cases the second function is performed at least partially by the input of the follow circuit.

More precisely, the present invention relates to frequency changing of input signals carrying information, each defined by a known frequency associated with the identity of the information transmitted.

It is known that each input signal also includes a band of frequencies around this known frequency. This band of frequencies may be fairly wide, for example in single sideband reception. In application of the invention to radio location the frequency band is extremely narrow.

The width of this frequency band has no basic influence on the performance of the invention. However, it is more difficult to design systems of extremely narrow passband. This is why the present specification is directed to this latter case; effecting removal of the adjacent band of frequencies, which is assumed to be extremely narrow.

The present invention is particularly suitable for use in the selection of at least one of the pieces of information carried respectively by input signals of the type defined above, each having a frequency selected from a predetermined range of high frequencies. By a frequency selected from a predetermined range of high frequencies is meant a frequency capable of varying within the said range, this variation corresponding to a change of identity of the required information.

In accordance with one known technique for this purpose, which does not include frequency changing, a suitable quartz filter is used for each high frequency of each input signal capable of being utilised. This arrangement is of a complexity which increases rapidly with the number of useful high input frequencies and which makes it very difficult to use and even unusable.

In accordance with the invention it is proposed to effect lowering of frequency of the various input signals carrying different pieces of information so as to bring them into the same condition for the use of this information. In other words, the frequency of the input signals is lowered, and they are fed to the same processing circuit whatever their initial frequency in the predetermined range. Independently of the nature of the processing to be applied to the pieces of information, the input of the processing circuit may be regarded as having a fixed passband. Consequently it is necessary for each input signal that is to be used to undergo a reduction of frequency such that its frequency may be included in a predetermined fixed passband. Any signal obtained by reduction of the frequency of an input signal, the frequency of which is selected from the predetermined range, will be termed "useful signal" hereinafter. Also the words "useful input signal" will be used to denote a distinction from parasitic signals (for example image frequencies).

Two difficulties emerge. The first results from the fact that the output signal from each frequency change must be as full of information as the input signal. The second is connected with the large number of different frequencies that the various useful input signals may have.

The first difficulty, in technical terms, is that the heterodyne frequency or frequencies has or have to be of sufficiently good stability for the useful signal, after heterodyning, (with possibly its band width) to pass into the fixed bandpass filter constituted by the utilisation circuit. The input signals being of very narrow band width, the stability of the heterodyne frequencies depends on the ratio of the band width of the fixed bandpass filter to the weakest high frequency capable of being used in the said predetermined range.

It is evident that the stability necessary is very high. When it is required to use a high frequency selected from the predetermined range, the need for this high stability prevents the heterodyne frequencies from being obtained by continuous variation of frequency, as is the case for example in television receivers.

There is a technical solution for furnishing frequencies of high stability with high resolution as required. This technical solution involves the use of circuits known in the art as synthesisers. It is known that a synthesiser may be controlled so as to furnish, starting from a frequency F, a frequency $F_n$ such that $F_n = F \times n/K$ where K is a whole number characteristic of the synthesiser, and $n$ is a whole number which is predetermined or is variable in a controlled manner between zero and K − 1.

However, synthesisers have an inherent disadvantage in the manner in which they furnish a given frequency. This disadvantage is due to the fact that their output signal includes not only a fundamental frequency and harmonics of this fundamental frequency, but also spectral lines of frequencies adjacent the fundamental frequency, which are also called "fringes". In order practically to eliminate this undesirable effect, a frequency divider circuit (numerical dividing counter) is connected in known manner to the output of the synthesiser, the division factor being as high as possible.

Now, it is evident that the input frequency applicable to a synthesiser is limited for technological reasons (at present about 30 MHz). The output frequency of a synthesiser associated for example with a circuit which divides by 1000 is therefore limited upwardly to 30 kiloHertz. Such a frequency is insufficient to serve as a heterodyne frequency for input signals of high frequency.

The particular object of the present invention is to provide a frequency changing stage of special design adapted to serve as a component in frequency changing devices in which the heterodyne frequencies have sufficient stability in the sense defined above, whilst permitting change of frequency of an input signal selected from a predetermined range of high frequencies. This frequency changing stage is called "of the first type".

In accordance with another aspect of the invention, an electronic frequency changing device includes one or more frequency changing stages of the first type such as defined above, and a final frequency changing stage of a second type comprising a synthesiser-divider circuit for furnishing the heterodyne frequency. The combination of these frequency changes permits reduction of the frequency of input signals selected from a predetermined range of high frequencies to a signal of low frequency which is included in a fixed passband, which may be extremely weak.

The frequency changing stage of the first type in accordance with the invention utilises a high stability source of frequencies for generating the heterodyne frequency, and it comprises:

- a circuit for dividing the frequency of the said source, capable of furnishing a heterodyne signal the frequency of which is selected from a plurality of successive multiples of a predetermined frequency $f$,
- a circuit for mixing the input signal with the heterodyne signal,
- the frequency of the heterodyne signal being such that the useful output signal of the mixer circuit has a frequency between $f/2$ and $f$.

With great advantage, a frequency changing stage of the first type includes a bandpass filter preceding the mixer circuit so as to transmit its useful signal to it, the bandpass filter being adapted to allow the passage of the selected high frequency of the input signal whilst eliminating its image frequency.

The electronic frequency changing devices according to the invention are intended to lower the frequency of an input signal of a high frequency selected from a predetermined range of high frequencies, such that the signal obtained is within a low frequency fixed pass band of a utilisation circuit, using a frequency source of high stability. A frequency changing device includes, connected in series from the point of view of the useful signal:

- at least one frequency changing stage of the first type, using the high stability frequency source for producing the heterodyne frequencies,
- a final frequency changing stage of a second type comprising:
- a synthesiser frequency divider circuit which receives a signal derived from the frequency source,
- a final circuit for mixing the useful signal coming from the preceding frequency changing stage and the heterodyne signal from the output of the synthesiser-frequency divider circuit,
- the synthesiser-divider circuit being controlled in such manner that the heterodyne frequency that it furnishes is such that the output signal of the mixer circuit is within the fixed passband of the low frequency filter.

In the present specification and claims, the term "synthesiser-frequency divider circuit" will be used for a circuit which includes at least one synthesiser followed by a frequency divider and capable of furnishing at least one frequency which is a multiple of a step in frequency equal to the quotient of the input frequency of the synthesiser-divider circuit by the product of a number which is characteristic of the synthesiser and of the division factor of the frequency divider, the order of the said multiple frequency being lower than the said characteristic number of the synthesiser.

In accordance with a first practical form of the frequency changing device, the step in frequency at the output of the synthesiser-divider circuit is at most equal to the width of the fixed passband of the low frequency filter. The synthesiser-divider circuit then includes a controlled synthesiser followed by a frequency divider, the synthesiser being capable of being controlled so that the synthesiser-divider circuit furnishes as desired one or other of the multiples of the step in frequency from the zero order to the order equal to the characteristic number of the synthesiser, itself excluded. In the following, the term controlled synthesiser-divider circuit will be used for such a synthesiser-divider circuit which includes a controlled synthesiser. This enables the selection as desired of a high input frequency of the frequency changing device anywhere in the predetermined range.

In accordance with a second practical form, in which the high frequency of the input signal of the device is selected from a plurality of discrete values in the predetermined range, the step in frequency of the synthesiser-divider circuit is related to the difference between the discrete values of the said plurality. In this case, it is also very advantageous to use a controlled synthesiser-divider circuit in the final frequency changing stage.

Figure 1A:
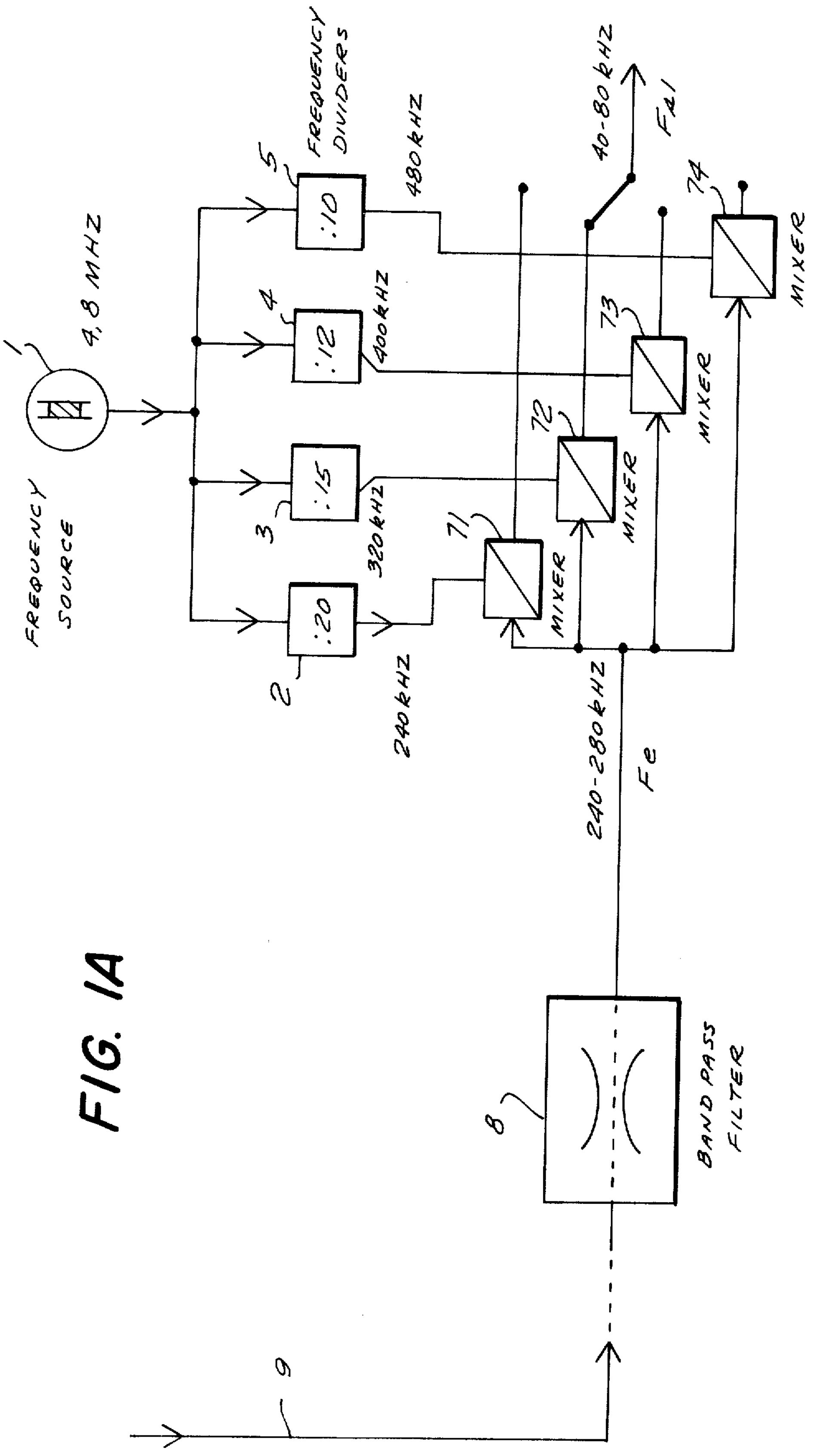
Figure 2:
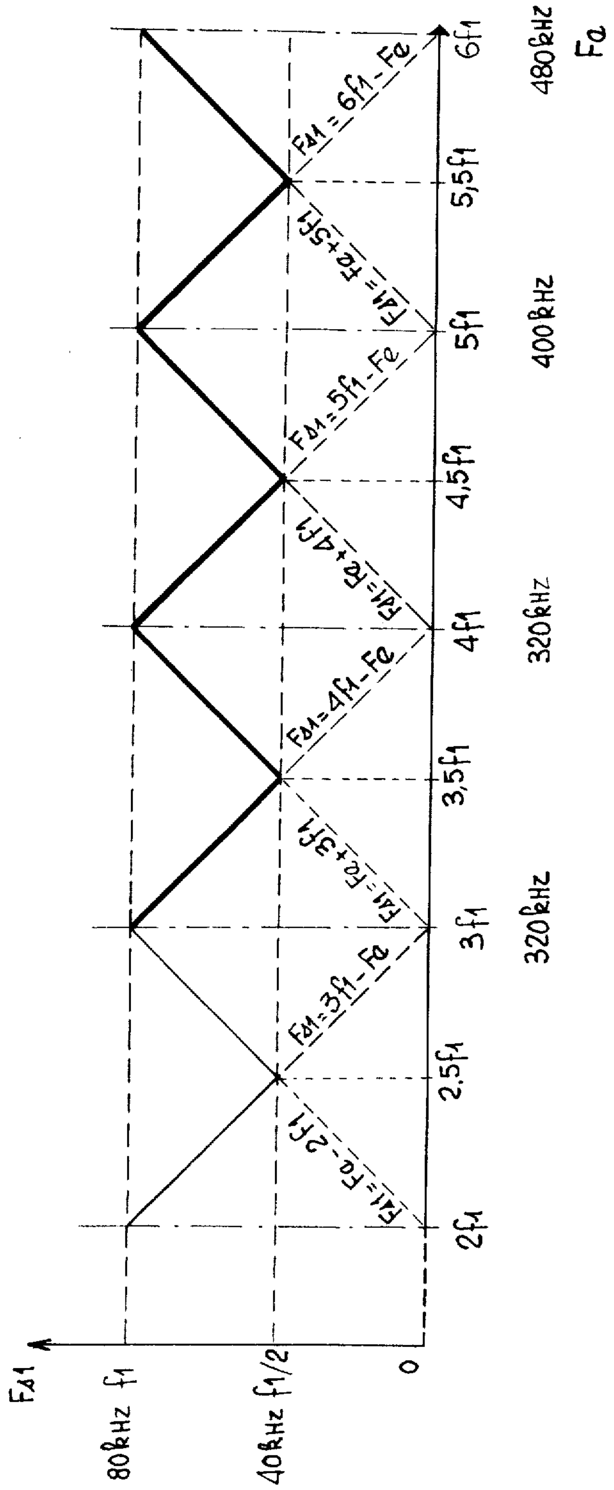
Figure 3:
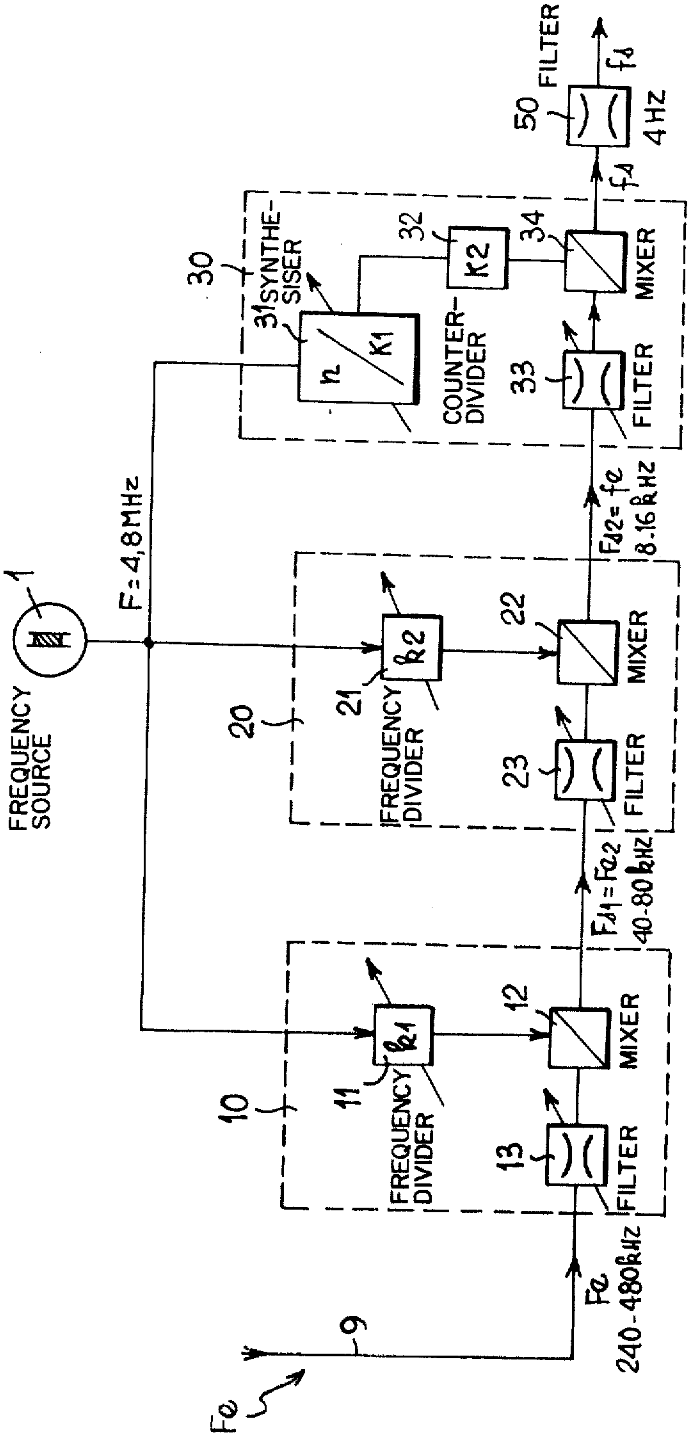
Figure 4:
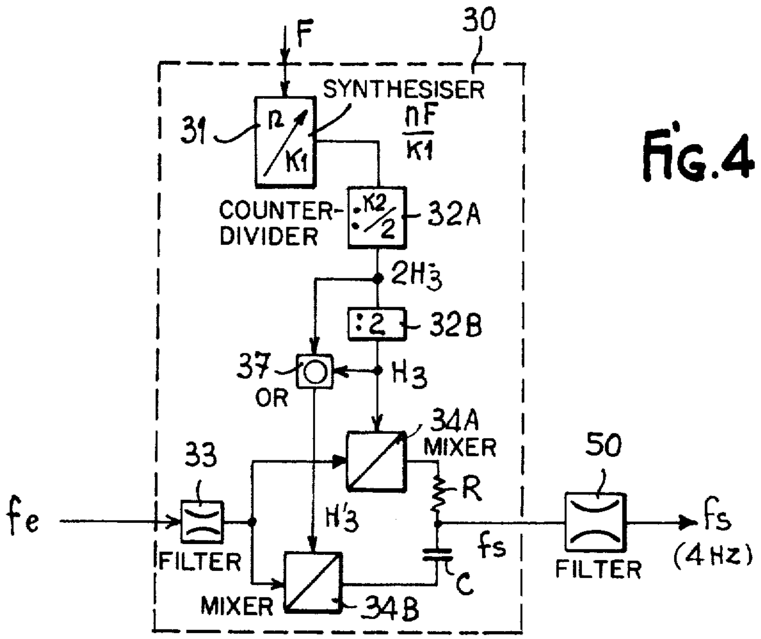
Figure 5:
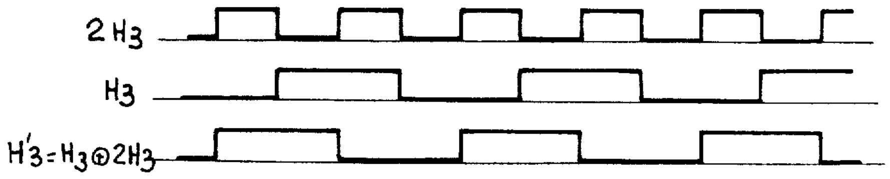
Figure 6:
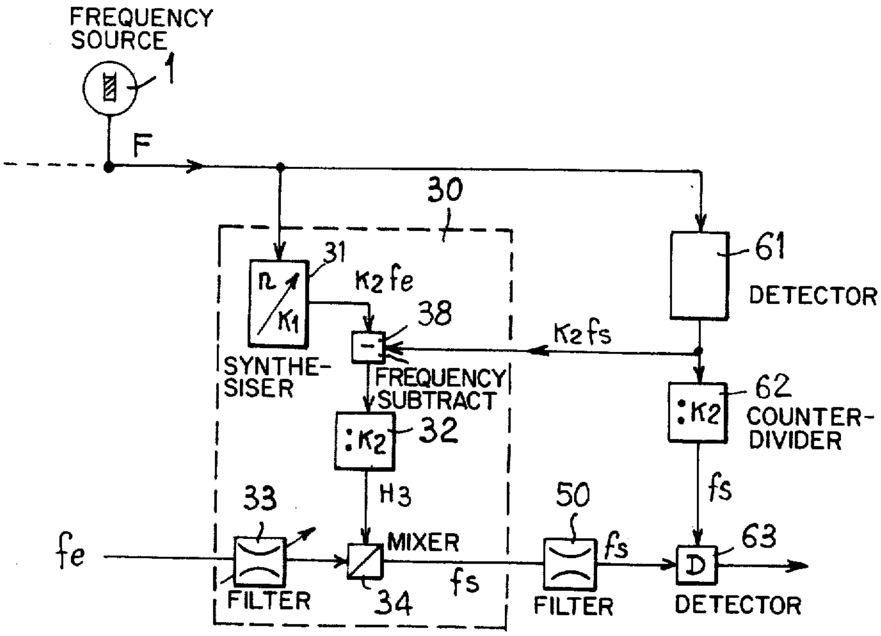
Figure 6A:
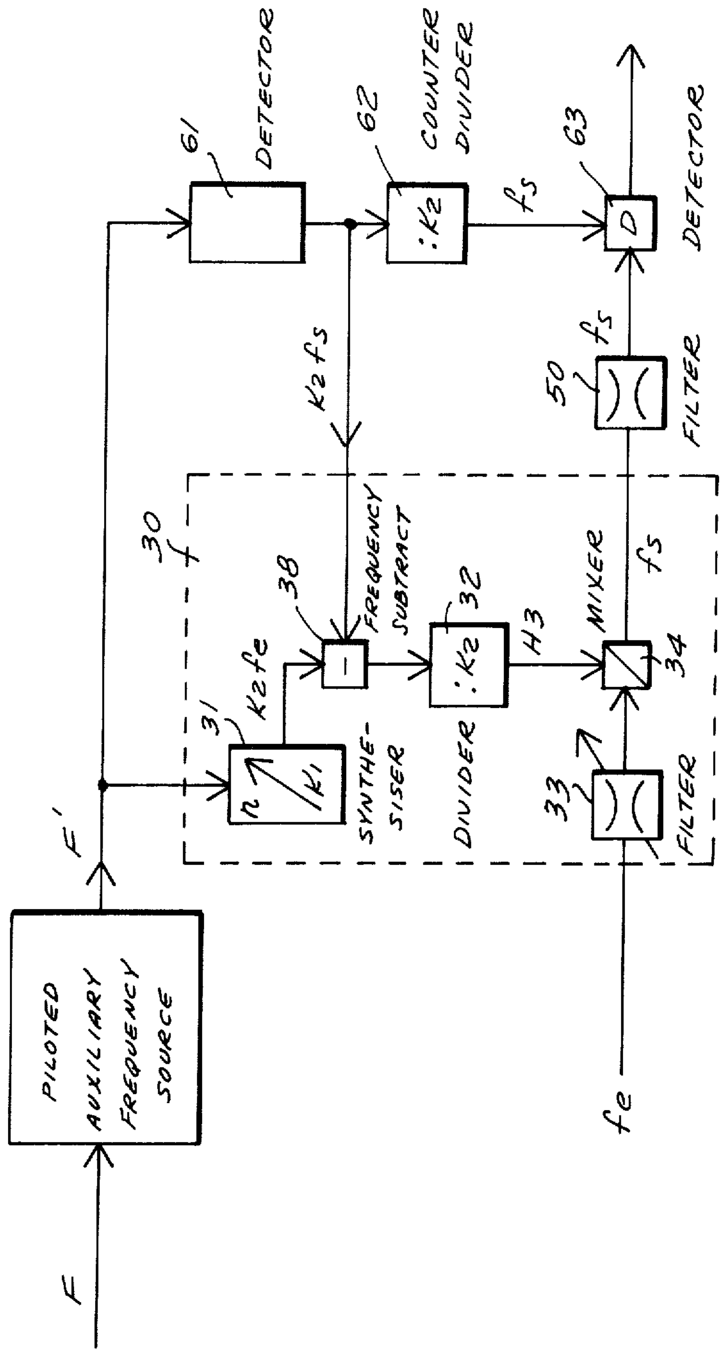
Figure 7:
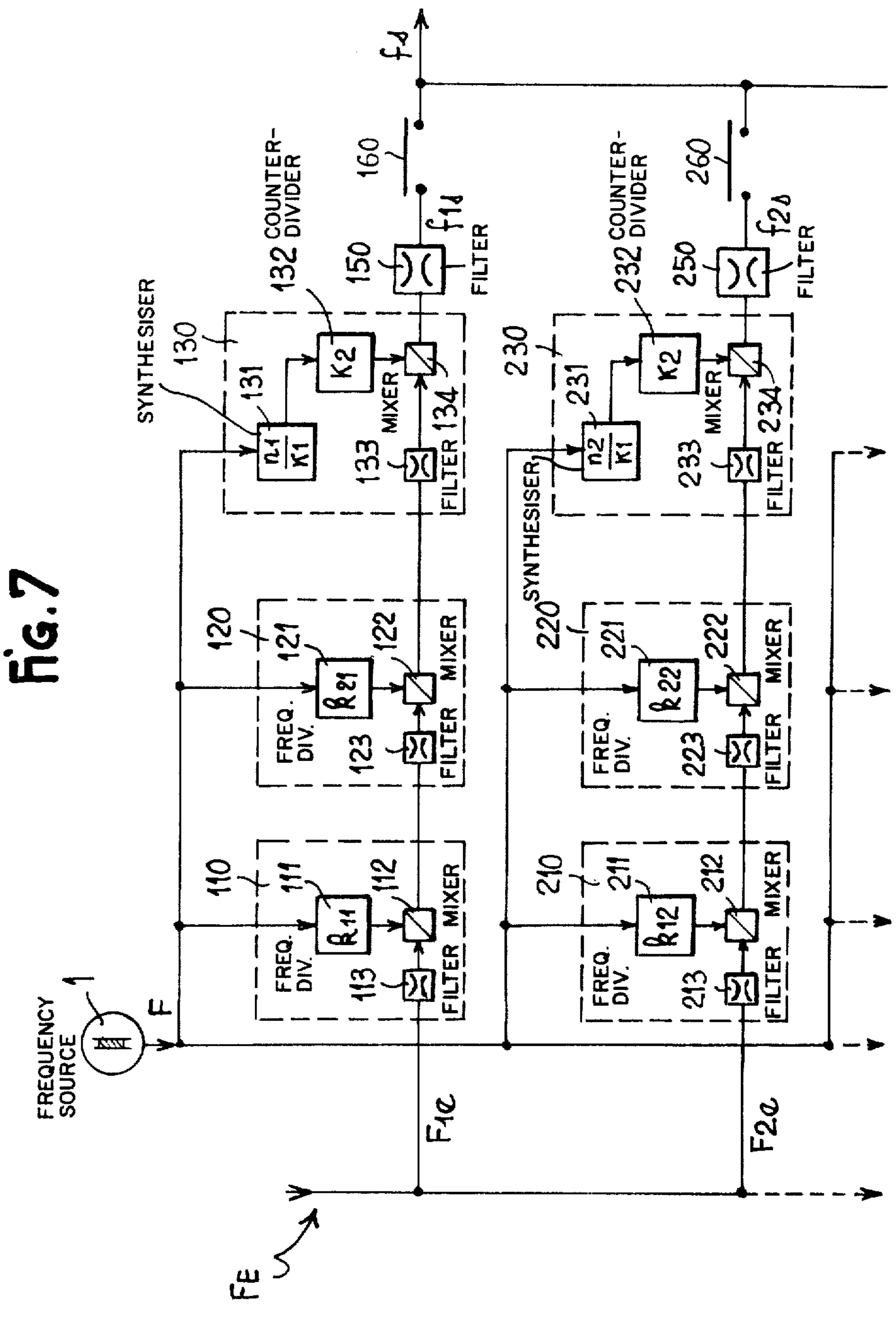

Other features and advantages of the invention will appear from the following detailed description with reference to the accompanying drawings in which:

FIG. 1 illustrates diagrammatically the electrical arrangement of a frequency changing stage of the first type in accordance with the present invention, FIG. 1A illustrates an arrangement similar to that of FIG. 1 but employing a plurality of mixers, FIG. 2 is a graph showing as abscissa the predetermined range of input frequencies and as ordinates the output frequencies for various values of the heterodyne frequency in FIG. 1, FIG. 3 illustrates diagrammatically the electrical arrangement of a frequency changing device according to the invention including two frequency changing stages of the first type and a final frequency changing stage of the second type, FIG. 4 shows diagrammatically in part detail the electrical arrangement of a modification of the final frequency changing stage of FIG. 3, permitting the elimination of the image wave from this change of frequency, FIG. 5 is a time diagram showing wave forms at points in the diagram of FIG. 4, FIG. 6 illustrates the electrical arrangement of another modification of the final stage of a frequency changing device in accordance with the invention, associated with synchronous detection circuits, FIG. 6A illustrates an arrangement similar to that of FIG. 6, but showing an auxiliary source for feeding the final stage, and FIG. 7 illustrates another practical form of frequency changing device in accordance with the invention, for use in particular when it is desired to receive simultaneously a plurality of input signals having frequencies in the predetermined range.

In this specification the word frequency is in constant use. It is known that at any given instant a sinusoidal signal has one frequency and one phase. As it is necessarily a question of a frequency in the physical meaning of the term, it is clear that the expression of the numerical value of this frequency and therefore the significance of the word frequency depend on the stability of this frequency.

In the present specification it will be assumed that the high frequency of the input signal is very stable. It is therefore desirable to use it with a very narrow passband. The heterodyne frequencies must therefore be of very high stability.

Furthermore, it is known that information of frequency (and/or of phase) may be carried out not only by sinusoidal signals but also by any periodic signal having at any instant the same fundamental frequency (and the same stability) as the sinusoidal signal. Of course, the periodic signal also includes harmonics which are not troublesome to the extent that they correspond to frequencies which are very much higher and which may easily be eliminated.

At the present time numerous ways are known of generating signals representative of sinusoidal signals, for example by means of signals constituted by pulses, or square signals. It will be understood that the signals considered in the present specification and claims may be any signals whatever of this type.

For example, in the following detailed description there will be considered a frequency source of very high stability capable of furnishing pulses of which the repetition rate is equal to this frequency with very high precision.

In FIG. 1 there is illustrated a practical form of frequency changing stage of the first type in accordance with the present invention. This frequency changing stage includes a frequency source 1 of high stability, the frequency of which is assumed to be 4.8 MHz.

The source 1 is connected to a frequency divider circuit which includes a plurality of frequency dividers 2, 3, 4, 5 having respectively division factors 20, 15, 12 and 10. These frequency dividers are advantageously numerical dividing counters.

The frequency changing stage in FIG. 1 also includes a mixer circuit which includes a mixer of known type capable of receiving square signals as heterodyne frequency. These square heterodyne signals are furnished by the output of one of the counter-dividers 2 to 5 by means of a switch 6 illustrated diagrammatically as a mechanical switch. In general, the heterodyne frequencies are designated by the letter H.

In application to the reception of high frequency waves, illustrated in FIG. 1 by an antenna 9, a bandpass filter 8 is provided for transmitting the received high frequency signals to the input of the mixer circuit 7. In the case in which the input signals are practically pure, the use of the bandpass filter 8 at the input of the first frequency changing stage is unnecessary.

The heterodyne frequencies furnished at the output of the counter-dividers 2 to 5 have the respective values 240 kHz, 320 kHz, 400 kHz and 480 kHz. The frequencies are respectively the multiples of order 3, 4, 5 and 6 of a frequency $f_1$ = 80 kHz. This frequency $f_1$ is called the frequency associated with the frequency changing stage of the first type.

The frequency changing stage in FIG. 1 enables the lowering, in accordance with the invention, of the frequency of an input signal included in the range 240 to 480 kHz, so as to furnish an output frequency included between 40 and 80 kHz, that is to say between $f_1/2$ and $f_1$.

FIG. 2 illustrates diagrammatically the selection of the heterodyne frequency in relation to the input frequency so as to obtain an output frequency included between $f_1/2$ and $f_1$.

In this figure, the frequency of the input signal, marked as abscissa, is denoted by $F_e$ and the frequency of the output signal, marked as ordinate, is denoted by $F_{s1}$.

As can be seen in FIG. 2, the predetermined image of input frequencies, which is from $3f_1$ to $6f_1$, may be considered as being divided into a plurality of intervals by each of the multiples of the frequency $f_1$ that correspond to a heterodyne frequency.

The heterodyne frequency applied to the mixer 7 in FIG. 1 is selected by means of the switch 6 so as to be equal to that one of the heterodyne frequencies being a multiple of the frequency $f_1$ which is the upper limit or the lower limit of the interval in which the selected high frequency of the input signal is located, this selected high frequency of the input signal being located in the lower or upper half of the said interval respectively.

For example, if the selected high frequency of the input signal is equal to 256 kHz, that is to say $3.2f_1$, this frequency is located in the first half of the interval ($3f_1$, $4f_1$). Consequently, the heterodyne frequency is taken as equal to the upper limit of the interval, that is to say $4f_1$. In the graph, this is illustrated by the fact that for the first half of the interval ($3f_1$, $4f_1$) the output frequency is defined by the straight portion the equation of which is $F_{s1} = 4f_1 - F_e$. The heterodyne frequency is therefore $4f_1$, and it is clear that the output frequency is included between $f_1/2$ and $f_1$, that is to say between 40 and 80 kHz.

The four values of heterodyne frequency available at the outputs of the counter-dividers 2 to 5 in FIG. 1 therefore enable the frequency $F_e$ of an input signal selected from the range 240 to 480 kHz to be changed so as to obtain an output signal the frequency $F_{s1}$ of which is between 40 and 80 kHz.

The frequency applied to the counter-dividers 2 to 5 of FIG. 1 cannot have just any value in relation to the value of the frequency $f_1$. In fact, this frequency must be equal to or a multiple of the product of $f_1$ and the lowest common multiple (in the mathematical sense) of the whole numbers representing the orders of multiples of $f_1$ furnished by the counter-dividers such as 2 to 5. For the embodiment described, the multiples are of the orders 3, 4, 5 and 6. The lowest common multiple of these four whole numbers is 60. Consequently it is necessary for the frequency applied to the counter-dividers to be equal to 60 × 80 kHz = 4.8 MHz. In the case in which the frequency of the high stability source is a multiple of the order $p$ of this value, the division factors of the counter-dividers are multiplied by $p$, or better, a common counter-divider is provided for furnishing the frequency of 4.8 MHz to be applied to the individual counter-dividers 2 to 5.

The general case of a frequency changing stage of the first type associated with a frequency $f$ will now be considered.

It has been found that since the lowest common multiple of the whole numbers representing the successive multiples of the frequency $f$ increases rapidly when the largest of these whole numbers is increased, it is preferable not to use a heterodyne frequency the value of which is greater than $6f_1$.

Moreover, the ratio of the input frequency to the output frequency is high when the heterodyne frequency corresponding to the highest of the multiples is raised, this implies that it is then more difficult to eliminate the image frequency of the input frequency by filtering. In fact, these latter frequencies are the closer, the higher the ratio of the input frequency to the output frequency of a frequency changing stage.

It has also been found that the lowest of the multiples of $f$ must be at least equal to $2.f$, since a heterodyne frequency equal to $f$ could furnish an output signal of the same frequency $f$, which is impracticable.

Under these conditions it is possible to take only the multiples $2.f$ and $3.f$. However, it is advantageous to take, for preference, a frequency $f' = f/2$ associated with an interval ($4f'$, $6f'$), which enables a greater reduction of frequency in the frequency changer. Hence, the highest multiple of $f$ is advantageously at least equal to 4.

It will clearly be seen that a frequency changing stage of the first type enables a large change of frequency of high frequency signals to be made whilst considerably reducing the frequency excursion. For example, in the case of the frequency changing stage in FIG. 1 the input frequency may vary by 240 kHz whereas the output frequency varies only by 40 kHz. This is obtained by means of frequency divider circuits furnishing a plurality of successive multiples of a frequency $f$. According to the value of the high input frequency to be used, one of the heterodyne frequencies is selected by means of the switch 6 in FIG. 1. The switch 6 may be a mechanical switch actuated manually or it may be actuated automatically in response to means for selecting the high frequency to be received. The practical form of such automatic means, which are used in logical electronic circuits, is regarded as being within the knowledge of a person skilled in the art.

As essential advantage of the arrangements according to the invention to be described is that the stability of the heterodyne frequencies depends only on the stability of the frequency source 1. The association of counter-dividers capable of furnishing these whole multiples of a frequency $f$ with a mixer circuit, with the object of furnishing an output frequency between $f/2$ and $f$, is for this reason regarded as an essential feature of the invention.

In FIG. 1 is shown an embodiment of the invention which includes a single mixer that receives a heterodyne frequency selected by means of the switch 6. In another embodiment, illustrated in FIG. 1A, the mixer circuit includes a plurality of mixers 71, 72, 73 and 74 each receiving a respective one of the heterodyne frequencies furnished by the counter-dividers 2 to 5. In this case selection of the heterodyne frequency consists simply in selecting the output from one of the mixers of the mixer circuit 7.

As will be seen later with reference to FIG. 7, this arrangement also permits the selection of two or more of the outputs of the mixers of the mixer circuit. This is of particular interest when it is desired to use simultaneously several input signals having several respective high frequencies selected from the predetermined range.

FIG. 3 illustrates diagrammatically an embodiment of a frequency changing device in accordance with the present invention. This frequency changing device is intended for the reception of an input signal of high frequency selected from the predetermined range of 240 to 480 kHz. It includes a frequency source of high stability 1, an antenna 9 for receiving the high frequency signals, a first frequency changing stage 10 of the first type, a second frequency changing stage 20 of the first type, and a final frequency changing stage 30 of the second type with a controlled synthesiser 31 and a counter-divider 32 for furnishing the heterodyne signal.

The first frequency changing stage 10 is exactly as has been described above with reference to FIG. 1. For the purpose of illustration the plurality of counter-dividers are shown in the form of a divider circuit 11 having a division factor $k_1$ which is variable by discrete values to furnish a plurality of successive multiples of the frequency $f_1$ associated with the first frequency changing stage 10. In the present case these successive multiples are $3.f_1$, $4.f_1$, $5.f_1$ and $6.f_1$ as in the case of FIG. 1, with $f_1 = 80$ kHz.

The first frequency changing stage 10 also includes a mixer circuit 12. It also includes preceding filtering means 13. In FIG. 3 these filtering means are shown as being variable. In fact for certain applications it is possible to perform the invention with fixed filtering means. However, it is often advantageous to shift the passband of the filter 13 according to the selected high frequency of the input signal. Preferably the passband of the filter 13 is shifted in a discrete manner at the same time as the division factor of the divider circuit 11.

The input frequency $F_{e2}$ applied to the second frequency changing stage 20 is equal to $F_{s1}$, hence it is between 40 and 80 kHz. Such frequencies are too high to be the subject of a frequency change with the aid of a heterodyne frequency furnished by a synthesiser followed by a counter-divider. This is why the output signals $F_{s1}$ of the first frequency changing stage 10 of the first type are applied to a second frequency changing stage of the first type 20, which therefore includes a frequency divider circuit 21, a mixer circuit 22 and a filter circuit 23 ahead of the mixer circuit 22.

The frequency $f_2$ associated with the second frequency changing stage must be sufficiently low for the following stage to include a synthesiser. In accordance with the invention it is advantageously a sub-multiple of the maximum output frequency of the preceding frequency changing stage, which is $f_1$.

In a practical form of the second frequency changing stage 20 the associated frequency $f_2$ is 16 kHz (that is to say $f_1/5$), and the frequency divider circuits furnish the multiples $2.f_2$, $3.f_2$, $4.f_2$ and $5.f_2$, that is to say 32 kHz, 48 kHz, 64 kHz and 80 kHz respectively. It will be seen that the range 40 to 80 kHz is included between the smallest and the largest of these multiples.

In this case, the divider circuit 21 in FIG. 3 comprises 4 numerical counter-dividers having the respective division factors 150, 100, 75 and 60, and fed with the frequency 4.8 MHz from the source 1.

The heterodyne frequency of the second stage 20 is selected from the frequencies available at the output of the divider circuit 21 according to the position of the input frequency of the second stage 20 relative to the intervals constituted by the heterodyne frequencies which are multiples of $f_2$, in the same manner as was indicated during the description of the frequency changing stage in FIG. 1, with reference to the graph in FIG. 2.

It should be noted that it is possible to arrange the second frequency changing stage 20 differently, by taking an associated frequency $f_2$ of 20 kHz ($f_1/4$), with multiples 40, 60, and 80 kHz furnished by the circuit 21 or $f_2 = 13\ 5/8$ kHz ($f_1/6$), with multiples of order 3 to 6 of this latter value.

In general, after a first frequency change of the first type has been effected, the range of variations of the input frequency for the frequency changes of the first type which follow is well defined since it is from $f_1/2$ to $f_1$. The frequency associated with the frequency change which follows is in general then selected from the sub-multiples of order 4, 5 and 6 of the frequency $f_1$, accepting for reasons indicated above that the greatest multiple of $f_2$ is of an order between 4 and 6.

The filter 23 of the second frequency changing stage is advantageously variable, as indicated for the filter 13.

These filters have essentially the function of eliminating the image frequency from the frequency change of the first type which immediately follows. It has been explained above that for these changes of frequency the ratio of the input frequency to the output frequency remains relatively small (lower than 12 if the order of the largest multiple is 6). These filters may be of simple form, for example in the form of a filter of conventional type with inductance and capacitance having two or three circuits. Variation may be obtained by using cage condensers in a manner known in itself. It will be noted that, moreover, the need for a high stability of the heterodyne frequencies does not involve a correlative precision of filtering.

The output signal of the second stage 20 of the first type therefore varies between 8 kHz and 16 kHz. This signal is applied as input signal $f_e$ to the final frequency changing stage 30 of the second type the heterodyne frequency of which is furnished by a controlled synthesiser-divider circuit which includes a controlled synthesiser 31 which receives the frequency 4.8 MHz from the source, followed by a counter-divider 32.

The output signal of the second stage 20 is applied through the intermediary of a variable filter 33 to the input of the mixer circuit 34 of the last frequency changing stage 30, which receives the heterodyne frequency available at the output of the counter-divider 32.

Preferably, the output signal of the mixer 34 is applied to an output filter 50 having a fixed low frequency passband. As previously indicated, the filter 50 defines the input conditions of the utilisation means. It will be assumed by way of example that this filter is centred on the frequency 4Hz and has a passband of 0.5 Hz. This passband of 0.5 Hz referred to the maximum value of high frequency input (480 kHz) corresponds to a stability of $10^{-6}$, which is very high.

The controlled synthesiser 31 is capable of delivering, starting from the frequency F = 4.8 MHz from the source 1, a frequency $n/K_1$. F, where $K_1$ is a whole number characteristic of the synthesiser, and $n$ is a whole number selected in a controlled manner between zero and $K_1 - 1$. The counter-divider 32 has a division factor $K_2$.

When the synthesiser 31 is controlled in such manner that $n = K_1 - 1$, the frequency available at the output of the counter-divider 32 has its maximum value, which is practically equal to $F/K_2$.

Since the maximum input value of the final frequency changing stage 30 is 16 kHz, it is necessary for the division factor $K_2$ of the counter-divider 32 to be 300 in order that the output frequency $f_s$ of the stage 30 may in this case be close to 4 Hz.

The value of the number $K_1$ which is characteristic of the synthesiser 31 depends on the value of the output frequency $f_s$ of the final stage 30, as well as the passband of the filter 50, on the discrimination or step of the high frequency selected in the high frequency range, and possibly on the fact that this step may be reduced by some switching of the heterodyne frequencies in the frequency changers of the first type.

If it be assumed that the step or discrimination in input frequency $F_2$ in the predetermined range is 1 Hz, that is to say the different values of the high frequencies selected from the predetermined range differ between themselves by 1 Hz or by a multiple of this value, then it is necessary for the step in frequency at the output of the counter-divider 32, viz. $F/K_1.K_2$, to be 1 Hz, which implies that the number $K_1$ is 16,000.

The step in input frequency is subject, such as it is at the input of the final stage 30, to the condition that the input frequency $f_e$ of the final stage 30 is a multiple of this step. In the contrary case, this step may be found to be sub-divided by reason of the discontinuities introduced by the changes of heterodyne frequency in each stage, particularly at the angular points of the graph in FIG. 2.

When the value of the step in input frequency $F_e$ is greater than the value of the output frequency $f_s$, in the event 4 Hz, it is the value of $f_s$ which determines the choice of the number $K_1$ which is characteristic of the synthesiser. Of course, in this case the value of $f_s$ must be a sub-multiple of the step in input frequency.

When it is desired to receive any frequency whatever in a continuous manner in the predetermined range of high input frequencies, it is the passband of the output filter 50 that determines the choice of the number $K_1$ which is characteristic of the synthesiser 31. In this manner it is possible, by controlling the synthesiser 31 and the division factors of the circuits 11 and 21, to lower the frequency of any high frequency signal selected from the predetermined range in order finally to obtain at the output of the mixer 34 a signal which is included in the passband of the filter 50.

A practical form of the filter 50, with the transfer characteristics mentioned above, consists of four successive cells each constituted by a condenser of 1 microfarad and a resistor of 40 kilohms. under these conditions the filter is centred on 3.9 Hz and has a passband of about 0.55 Hz at −3 dB.

In the frequency changing device described with reference to FIG. 3 the synthesiser 31 is fed directly from the high stability frequency source 1. It may be advantageous to feed the synthesiser 31 with a frequency of a value different from the frequency of the source 1, provided that the said frequency of different value is piloted by the source 1, that is to say at any instant it has the same stability as the frequency delivered by the source 1. Such an arrangement is illustrated in FIG. 6A. In French Pat. Specification No. 69 08 755 there are described means for producing a frequency F' having the same stability as a frequency F furnished by a very stable frequency source and which enable the synthesiser 31 to be fed with this frequency F'.

It has been seen above that the division factor $K_2$ of the counter-divider 32 is the greater, the lower is the maximum frequency applied to the input of the final stage 30. This is important since the filtering of the sidebands of the output signal of the synthesiser 31 is the better, the greater the division factor $K_2$. Hence there is often an advantage in arranging for lowering of the maximum frequency by means of frequency changing stages of the first type in accordance with the present invention.

Furthermore, when the range of input frequency of the final stage 30 is made very narrow, by effecting in advance as great a lowering of frequency as possible, the ratio of the step of the synthesiser to the maximum frequency of this range of input to the final stage 30 is a maximum, and this enables a synthesiser 31 to be used the characteristic number $K_1$ of which has the lowest possible value.

For the final frequency changing stage 30 the ratio of the input frequency to the output frequency is very high. The image frequency that enters into this latter change of frequency is therefore very close to the useful frequency. In the example selected, the spacing is of the order of 8 Hz. Consequently, it is very difficult to eliminate this image frequency by means of the filter 33 without the filter becoming very complex.

For certain applications it is not necessary to provide for the elimination of the image frequency from the final frequency changing stage.

When this elimination is necessary, it may be effected by using a final frequency changing stage 30 in accordance with the modification shown in FIG. 4. In this Figure the frequency changer includes two mixers 34A and 34B utilising two heterodyne signals which are in quadrature relative to one another.

In the embodiment described, the quadrature is obtained by using the counter-divider 32, which is separated into two parts, one part 32A having the division factor $K_2/2$ and the other part 32B having the division factor 2.

The output of the divider 32B is equivalent to the output of division by $K_2$ and furnishes a heterodyne signal represented by $H_3$. The shape of this square heterodyne signal $H_3$ is shown in FIG. 5. The output from the counter-divider 32A furnishes a signal of double the frequency which is in phase with the signal $H_3$ and which is shown in FIG. 5 at $2H_3$.

The signals $2H_3$ and $H_3$ are combined in an exclusive OR circuit 37 to furnish a signal $H'_3$ represented in FIG. 5, in which it is clear that the signal $H'_3$ is in quadrature relative to the signal $H_3$.

In known manner, the mixers 34A and 34B have their outputs added in series, one through the intermediary of a resistor R and the other through the intermediary of a condenser C. The common point of the resistor R and the condenser C then constitutes the output, and is connected for this purpose to the fixed passband filter 50. A person skilled in the art will easily appreciate that if the condition $2\pi RC f_s = 1$ is satisfied, the image input frequency of the stage 30 is eliminated. In this way there is obtained practically an attenuation of 40 dB of the image frequency.

In FIg. 6 is shown another practical form of the final frequency changing stage 30 associated with utilisation circuits which permit synchronous detection.

The embodiment of FIG. 6 is suitable in particular when the input frequency $F_e$ of the frequency changing device may be selected from a plurality of multiples of the same low frequency (for example 250 Hz), this frequency being high in relation to the frequency $f_s$. It is also suitable for the case (illustrated in FIG. 6) in which synchronous detection of the output signal of the final frequency changing stage 30 is effected, leading to the generation of a signal of the same frequency as the signal $f_s$.

In the embodiment of FIG. 6 the final frequency changing stage 30 is of the type described with reference to FIG. 3, in that it includes a frequency subtracting device or "box" 38 incorporated between the synthesiser 31 and the divider 32, and the synthesiser 31 furnishes a frequency $K_2.f_e$.

In the embodiment of FIG. 6 a circuit 61 is utilised in order to generate, starting from the frequency F furnished by the source 1, a frequency of value equal to $K_2.f_s$. The circuit 61 includes any known means for this purpose, for example means known in the art of synchronous detection.

The output of the circuit 61, which is of frequency $K_2.f_s$, is applied on the one hand to the subtraction input of the frequency subtracting device 38, and on the other hand to a counter-divider 62 which has a division factor $K_2$ and which consequently furnishes a frequency $f_s$.

The signal available at the output of the counter-divider 32 is therefore of frequency $f_e - f_s$. Consequently, the output signal of the final stage 30 is of frequency $f_s$. A synchronous detector 63 receives the output signal of the final frequency changing stage 30 and the output signal of the counter-divider 62, so as to effect synchronous detection.

The embodiment shown in FIG. 6 has the advantage that the step of the synthesiser does not depend on the input frequency $f_e$. This enables the step of the synthesiser to be selected independently of the value of the output frequency $f_s$. The high input frequencies that can be selected in the predetermined range all being multiples of 250 Hz, the step of the synthesiser may be selected to be $K_2$ times 250 Hz, the frequencies associated with the frequency change of the first type being equal to multiples of 250 Hz.

In an embodiment precisely designed for the above stated values, the number $K_1$ characteristic of the synthesiser is equal to 64, the division factor $K_2$ is equal to 300, and the circuit 61 is a counter-divider the division factor of which is 4,096.

Under these conditions, the step in frequency at the output of the counter-divider 32 is 4.8 MHz divided by the product $K_1.K_2$, viz. $300 \times 64 = 19{,}200$. This step in frequency is therefore 250 Hz.

The frequency available at the output of the counter-divider 62 is 4.8 MHz divided by the product of 4,096 (division factor of the counter 61) and 300 (division factor of the counter 62). The frequency applied to the synchronous detector 63 is therefore 3.9 Hz.

In the above-described frequency changing devices, the variable division factors furnish the heterodyne frequencies of the frequency changing stages of the first type, the controlled synthesiser furnishes the heterodyne frequency of the frequency changing stage of the second type, and the various filters, which may if desired be variable, enable the high frequency input signal $F_e$, selected in a predetermined range of high frequency, to be dealt with in a single frequency changing channel irrespective of the selected frequency.

In the description of a frequency changing stage with reference to FIG. 1, it was said that this stage could have a plurality of channels, that is to say a plurality of mixers each associated with a heterodyne frequency of fixed value.

This arrangement may be generalised in relation to the frequency changing devices in accordance with the present invention. In this case, each frequency changing stage of the first type includes a mixer circuit constituted by a plurality of mixers each associated with a counter-divider having a fixed division factor, the assembly of counter-dividers forming the frequency divider circuit. The final frequency changing stage of the second type also includes a mixer circuit constituted by a plurality of mixers each associated with an uncontrolled synthesiser, that is to say having a fixed value of the coefficient $n$, each synthesiser being followed by a counter-divider. The assembly of uncontrolled synthesisers each followed by a frequency divider then forms the frequency divider-synthesiser circuit.

It will be understood that it is also possible for a part of the frequency changing stages to have a single mixer and a variable heterodyne frequency in accordance with the invention, when another part of the frequency changing stages includes a plurality of mixers that receive respectively heterodyne frequencies of fixed value.

This is of particular interest when the number of high frequencies of the input signal which can be selected from the predetermined range is small. FIG. 7 illustrates by way of example an embodiment of a frequency changing device similar to that of FIG. 3 but in which each frequency to be received has its own frequency changing channel, the division factors being fixed and being selected in accordance with the value of the associated frequency in the same way as the fixed number defining the precontrol of the synthesiser. The reference numerals used in FIG. 7 are the same as in FIG. 3, except that the circuits associated with a first frequency $F_{1e}$ to be received have 100 added and the circuits associated with a second high frequency $F_{2e}$ to be received have 200 added.

In this case, the switching means for selecting a high frequency from the predetermined range merely include interrupters 160 and 260 associated respectively with the input frequencies $F_{1e}$ and $F_{2e}$, and arranged at the outputs of the final frequency changing stages of the second type 130 and 230, for example following fixed bandpass filters 150 and 250. It will be understood that the outputs from the switches such as 160 and 260 are connected together to enable the further utilisation of a frequency selected from $F_{1e}$, $F_{2e}$, etc.

The invention can also be used when it is desired to receive simultaneously a plurality of frequencies selected from the predetermined range. In this case, it will be understood that there is a channel for each of these frequencies, that is to say there are at least as many frequency changing stages of the second type as there are different frequencies to be received simultaneously. More precisely, from one end to the other of the frequency changing device there are at least as many distinct frequency changing channels as there are frequencies to be received simultaneously, unless the high frequencies to be received simultaneously are in a relation such that at least the first frequency changing stage of the first type may be used for all the frequencies of the same division factor.

It is clear that the frequency changing devices according to the present invention, in which there are a plurality of different frequency changing channels, may be constituted by series-parallel combinations of frequency changing stages of the first type with a single mixer and a variable heterodyne frequency or with a plurality of mixers having respective fixed heterodyne frequencies, and that some elements may be common to a plurality of frequency changing channels, regardless of the fact that one or more high frequencies selected from the predetermined range are to be used simultaneously.

A practical form of frequency changing device for dealing with a plurality of frequencies simultaneously is obtained from further consideration of FIG. 7, omitting the switches 160 and 260 and the output line $f_s$. There are then obtained two totally separated frequency changing channels capable of furnishing simultaneously the low frequencies $f_{1s}$ and $f_{2s}$. If for example the division factors $k_{11}$ and $k_{12}$ are equal, it is advantageous to unite the first frequency changing stages 110 and 210.

We claim:

1. A frequency changing stage for changing the frequency of a high frequency input signal which is within a predetermined range of high frequencies, comprising a frequency source of high stability, frequency dividers coupled to said source and capable of furnishing a plurality of successive multiples of a predetermined frequency $f$, associated with the frequency changing stage, a mixer circuit capable of mixing the input signal with a heterodyne signal, and switch means for selectively connecting one of the successive multiples of the frequency f as a heterodyne signal to the mixer circuit, the selected heterodyne signal being of such frequency that the output signal of the mixer circuit has a frequency between $f/2$ and $f$.

2. A frequency changing stage according to claim 1 wherein the multiples of the frequency $f$ are between 3$f$ and 6$f$ inclusive, and the frequency of the source is 60$f$.

3. A frequency changing stage for changing the frequency of a high frequency input signal which is within a predetermined range of high frequencies, comprising a heterodyne frequency source of high stability, frequency dividers coupled to said source and capable of furnishing a plurality of successive multiples of a predetermined frequency $f$, associated with the frequency changing stage, a plurality of mixers, each for mixing the input signal with a respective one of said plurality of successive multiples of the predetermined frequency $f$, and switch means for selecting the output of one of the mixers, the selected mixer having such a heterodyne frequency that the selected output signal has a frequency between $f/2$ and $f$.

4. A frequency changing stage according to claim 3 wherein the multiples of the frequency $f$ are between 3$f$ and 6$f$ inclusive, and the frequency of the source is 60$f$.

5. A frequency changing device for transforming the frequency of input signals having frequencies which are within a predetermined range to a signal of low frequency included in a fixed passband, using a frequency source of high stability, including connected in series, I. at least one frequency changing stage of a first type comprising a divider circuit for dividing the frequency of the said source and capable of furnishing at least one heterodyne signal the frequency of which is one of a plurality of successive multiples of a predetermined frequency $f$, associated with the frequency changing stage, a circuit for mixing the input signal with said heterodyne signal, said heterodyne signal being of such frequency that the output signal of the mixer circuit has a frequency between $f/2$ and $f$, and II. a final frequency changing stage of a second type comprising a bandpass filter adapted to pass the output signal from the preceding frequency changing stage, a synthesizer frequency divider circuit for receiving a signal derived from the frequency source and producing an output signal having a frequency $n/K_1 \times F$, where F is the frequency of said source, $K_1$ is a whole number characteristic of the synthesizer-divider circuit, and n is a whole number between zero and $K_1 - 1$, a circuit for mixing the output signal from the bandpass filter and the output signal from the synthesizer-frequency divider circuit, and a low frequency filter of fixed passband, the synthesizer-divider circuit being controlled in such manner that the heterodyne frequency is such that the output signal from the mixer is within the fixed passband of the low frequency filter.

6. Frequency changing device according to claim 5, characterized in that the synthesizer-divider circuit includes a controlled synthesizer followed by a frequency divider, and means for controlling the controlled synthesizer so as to control the synthesizer-divider circuit

7. Frequency changing device according to claim 6, characterised in that the step in frequency of the synthesiser divided by the division factor of the frequency divider that follows it is at most equal to the said fixed passband of the low frequency filter, thereby enabling the use of any high frequency in the said predetermined range.

8. Frequency changing device according to claim 6, for high frequencies in the said predetermined range separated from one another by intervals which are multiples of a known elementary step, characterised in that the step in frequency of the synthesiser divided by the division factor of the frequency divider that follows it is equal to the said known elementary step.

9. Frequency changing device according to claim 6, for high frequencies in the predetermined range which are all multiples of a known low frequency, characterised in that it includes means for generating, from the frequency source of high stability, an auxiliary signal of fixed frequency equal to the product of the said known low frequency and the division factor of the frequency divider following the controlled synthesiser, and that it includes an algebraic frequency adder between the said controlled synthesiser and the frequency divider that follows it for algebraically adding the said fixed frequency to the output frequency of the controlled synthesiser for application to the frequency divider that follows it.

10. Frequency changing device according to claim 9, for also effecting synchronous detection by means of a synchronous detector that receives the output signal from the low frequency filter of fixed passband, characterised in that it includes another frequency divider circuit having the same division factor as that which is connected to the output of the frequency adder, for dividing the frequency of the auxiliary signal and furnishing its output signal as a local signal to othe said synchronous detector.

11. Frequency changing device according to claim 5, characterised in that the final frequency changing stage of the second type includes means for eliminating the image frequency associated with it.

12. Frequency changing device according to claim 5, characterised in that the final stage of frequency changing is adapted to receive a frequency different from that of the high stability source and derived from the latter for generating its heterodyne signal.

13. A frequency changing device for transforming the frequency of input signals having frequencies which are within a predetermined range to a signal of low frequency included in a fixed passband, using a frequency source of high stability, including connected in series, I. at least one frequency changing stage of a first type comprising frequency dividers coupled to said source and capable of furnishing a plurality of successive multiples of a predetermined frequency $f$, associated with the frequency changing stage, a plurality of mixers, each for mixing the input signal with a respective one of said plurality of successive multiples of the predetermined frequency $f$, and II. a final frequency changing stage of a second type comprising a plurality of bandpass filters each adapted to pass the output signal of a respective one of the mixers in the preceding frequency changing stage, a plurality of synthesizers each coupled to the frequency source and capable of producing an output signal having a frequency $n/K_1 \times F$, where F is the frequency of said source, $K_1$ is a whole number characteristic of the synthesizer, and $n$ is a whole number between zero and $K_1 - 1$, a plurality of mixers each for mixing the output signal from a respective one of the bandpass filters and the output signal from a respective one of the synthesizers, and a plurality of low frequency filters of fixed passband respectively coupled to the outputs of the mixers, the synthesizers being controlled in such manner that the heterodyne frequencies are such that the output signal of each of the mixers is within the fixed passband of the respective low frequency filter to which it is coupled.

14. Frequency changing device according to claim 13, characterised in that it includes switching means for selecting in a controlled manner the output of one of the mixers of the final stage of frequency changing in order to furnish the output signal of the device.

15. Frequency changing device according to claim 13, for using simultaneously a known plurality of high frequency signals from the predetermined range, characterised in that the final frequency changing stage includes mixers each associated with a synthesiser followed by a divider for supplying it with a heterodyne frequency, of a number at least equal to the said known number of high frequency signals.

* * * * *